(12) United States Patent
Otsuka

(10) Patent No.: US 6,731,820 B2
(45) Date of Patent: May 4, 2004

(54) IMAGE FILTER CIRCUIT AND IMAGE FILTERING METHOD

(75) Inventor: Katsumi Otsuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 550 days.

(21) Appl. No.: 09/791,587

(22) Filed: Feb. 26, 2001

(65) Prior Publication Data

US 2001/0017943 A1 Aug. 30, 2001

(30) Foreign Application Priority Data

Feb. 29, 2000 (JP) ........................................ 2000-053736

(51) Int. Cl.[7] ......................... G06K 9/40; G06F 17/10; H04N 5/21
(52) U.S. Cl. ........................ 382/262; 382/168; 708/304; 348/619
(58) Field of Search ................................ 382/262, 168, 382/260, 261, 254, 263, 264, 265, 266, 267; 708/202, 304; 327/551; 348/607, 615, 619

(56) References Cited

U.S. PATENT DOCUMENTS

| | | | | |
|---|---|---|---|---|
| 4,736,439 A | * | 4/1988 | May ............................ | 382/262 |
| 4,783,753 A | * | 11/1988 | Crimmins .................... | 382/275 |
| 4,979,136 A | * | 12/1990 | Weiman et al. .............. | 382/169 |
| 5,003,618 A | * | 3/1991 | Meno .......................... | 382/261 |
| 5,409,007 A | * | 4/1995 | Saunders et al. ............ | 600/447 |
| 5,933,540 A | * | 8/1999 | Lakshminarayanan et al. .. | 382/260 |
| 6,078,213 A | * | 6/2000 | Huang ......................... | 327/552 |
| 6,199,084 B1 | * | 3/2001 | Wiseman ..................... | 708/304 |
| 6,266,618 B1 | * | 7/2001 | Ye et al. ...................... | 702/10 |

FOREIGN PATENT DOCUMENTS

JP    5-233802    9/1993    ........... G06F/15/68

OTHER PUBLICATIONS

"Sorting and Searching, The Art of Computer Programming" vol. 3, 2Ed, by Donald Ervin Knuth, pp. 220–246.

* cited by examiner

*Primary Examiner*—Bhavesh M. Mehta
*Assistant Examiner*—Kanji Patel
(74) *Attorney, Agent, or Firm*—Fitzpatrick, Cella, Harper & Scinto (57) ABSTRACT

An image filter circuit which realizes a large-scale median filter as a digital circuit which has not been conventionally constructed without difficulty. The filter circuit has a histogram A update unit 102 which generates a histogram A with upper-bit data of pixels within a matrix, a cumulative adder A104 which searches for a class including a pixel value corresponding to a predetermined rank in ascending order as a target class based on the histogram A, a histogram B update unit 106 which generates a histogram B with lower-bit data of pixels included in the target class, and a cumulative adder B108 which searches for a pixel value of the predetermined rank in ascending order in the matrix. The filter circuit having these constituent elements outputs a median pixel value of the matrix.

16 Claims, 11 Drawing Sheets

IMAGE FILTER CIRCUIT AND IMAGE FILTERING METHOD

FIELD OF THE INVENTION

The present invention relates to an image filter circuit and an image filtering method, and more particularly, to an image filter circuit and an image filtering method for eliminating isolated dot noise from a digital image.

BACKGROUND OF THE INVENTION

As a nonlinear filter to eliminate spike-like isolated dot noise in an image, a median filter is known.

In use of median filter, an arbitrary-sized matrix is generated around a pixel of interest in an original image, then pixel values within the matrix are sorted from the greatest value, and the value of the pixel of interest is replaced with an median pixel value.

Hereinbelow, a general median filter will be described in detail with reference to FIGS. 2 and 3.

Figure 2:
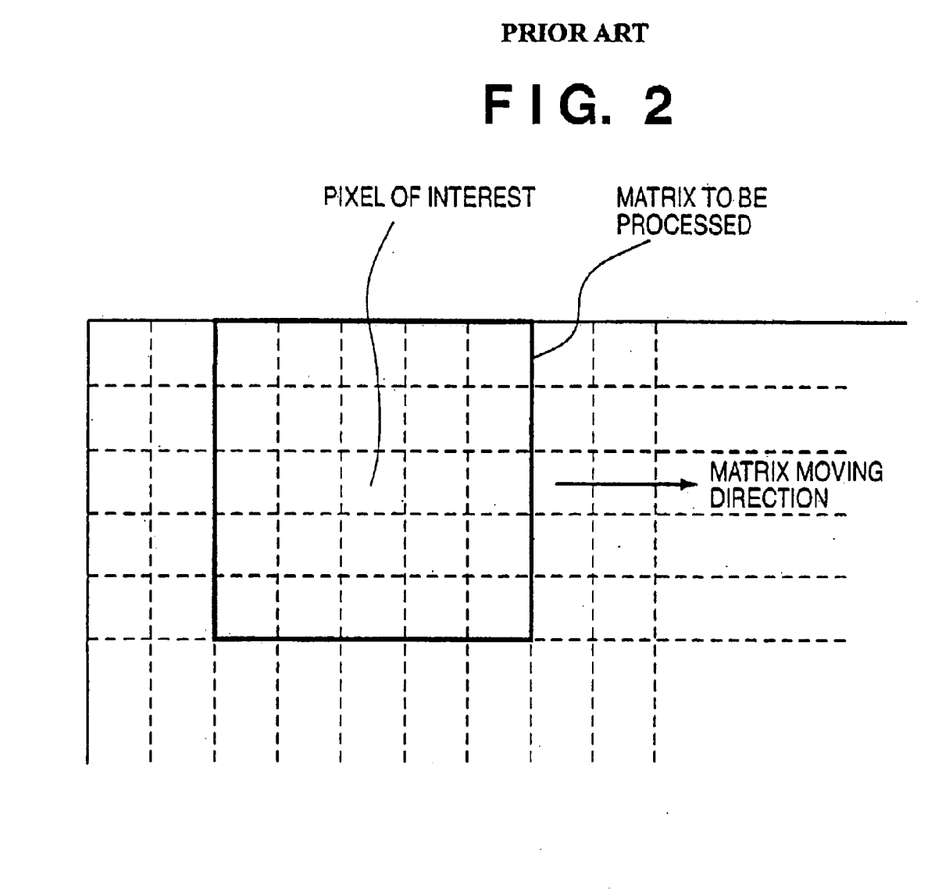
FIG. 2 is an explanatory view of a matrix subjected to filtering processing on an original image.

As shown in FIG. 2, filtering processing can be performed on all the pixels of original image by sequentially moving the matrix in a horizontal or vertical direction.

Figure 3:
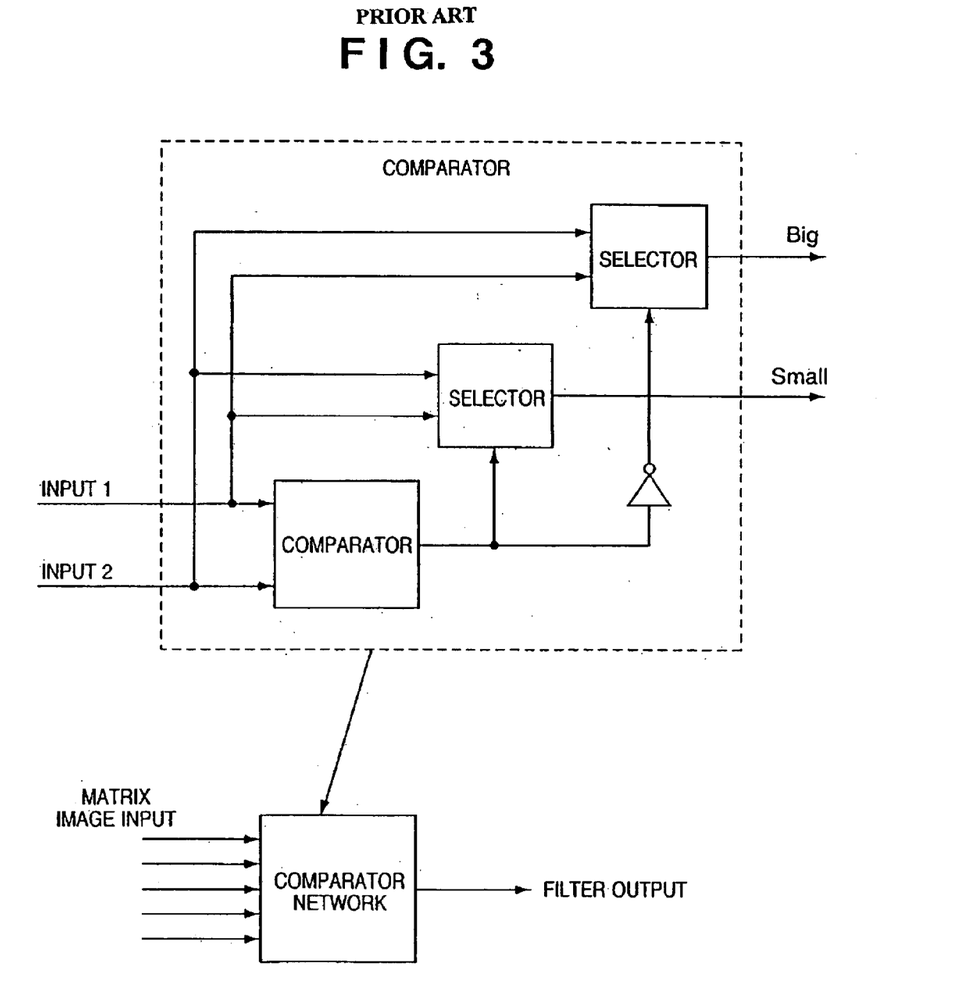
FIG. 3 is a block diagram showing the circuit construction of the conventional median filter.

FIG. 3 shows the circuit construction realizing the median filter. That is, to realize the median filter as a circuit, comparator circuits and selector circuits are prepared in correspondence with the number of sorting-comparison operations, and these circuits are sequentially combined so as to construct a network (comparator network).

For example, "Sorting and Searching, The Art of Computer Programming" by Donald Ervin Knuth, pp.220–246 discloses a technique to realize the sorting processing on an M×M (M is a natural number) sized matrix with comparator circuits, switching circuits and data latches.

According to the sorting technique, if M=3 holds, for example, 25 comparators and 25 selectors and 72 data latches construct a median filter circuit. Note that to realize the median filter circuit as a digital clock-synchronous type median filter circuit, further 90 data latches and 3 loaded data latches are required.

Further, if M=4 holds, to construct the median filter circuit, 54 comparators and 54 selectors, 176 data latches and loaded data latches are required.

In this manner, to realize the median filter as hardware by the above technique, as the M value of the matrix to be processed increases, the circuit scale radically increases.

For example, to construct the median filter circuit with M=7 matrix size, if the median filter circuit is constructed as a digital circuit for interdata clock synchronization, the circuit scale is so large that the circuit cannot be realized without difficulty.

Further, Japanese Patent Laid-Opened No. 5-233802 discloses a technique to construct a median filter by generating a pixel value table without sorting processing by the comparators. However, as the particular method of the processing and hardware implementability are not disclosed, the technique is not realistic.

SUMMARY OF THE INVENTION

The present invention has been proposed to solve the conventional problems, and has its object to provide an image filter circuit and an image filtering method for realizing a large-scale nonlinear filter as a digital circuit.

According to the present invention, the foregoing object is attained by providing an image filter circuit which moves a pixel matrix on an original image, replaces a value of pixel of interest in the pixel matrix with a pixel value of predetermined rank in ascending order within the matrix, and outputs the pixel value of the predetermined rank, comprising: first histogram generation means for generating a first histogram with upper bit data of pixels constructing the pixel matrix; first search means for searching for a class including a pixel value corresponding to the predetermined rank in ascending order, as a target class, based on the first histogram; second histogram generation means for generating a second histogram with lower bit data of pixels included in the target class; and second search means for searching for the pixel value of the predetermined rank in ascending order based on the second histogram.

In accordance with the present invention as described above, two-step search is performed with respect to high-bit histogram and lower-bit histogram of pixels within the pixel matrix, thereby a pixel value of a predetermined rank in ascending order within the matrix can be detected.

As the image filter circuit has the above construction, even if the matrix size increases, the increase in circuit scale is suppressed to that approximately in proportion to the matrix size. Accordingly, the circuit scale does not radically increase. That is, according to the present invention, a large-scale nonlinear filter to eliminate isolated dot noise in an image can be realized as a digital circuit.

Another object of the present invention is to provide an image filter circuit and an image filtering method enabling increase in circuit scale in accordance with increase in matrix size by a simple structure.

According to the present invention, the foregoing object is attained by providing the image filter circuit, wherein the first and second delay passes respectively have a flip-flop array corresponding to the number of the new pixels.

As the image filter circuit has the above construction, the increase in circuit scale can be realized by simply inserting the flip-flop array, thereby high-speed filtering processing can be performed while data sequence can be maintained.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
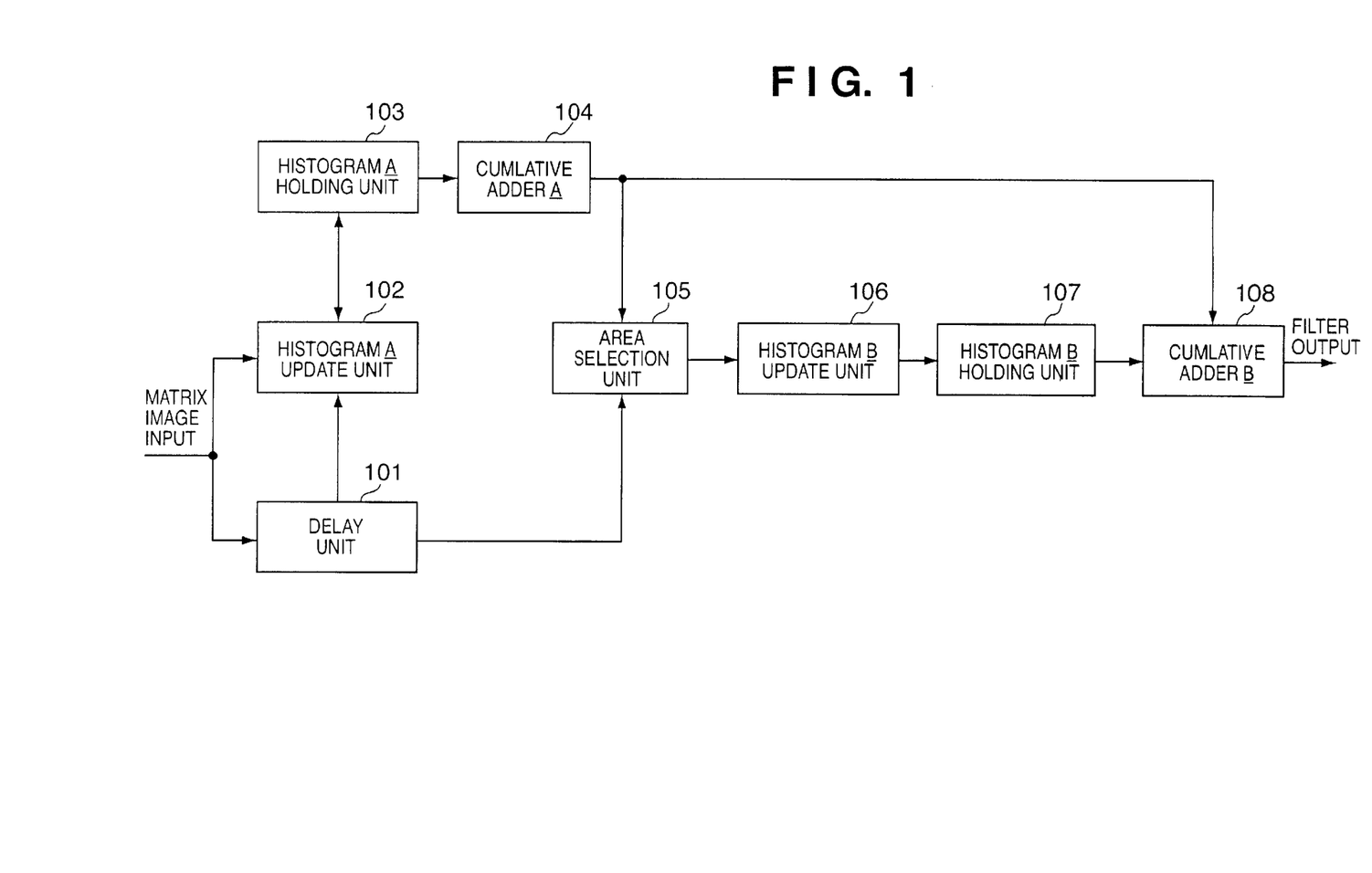
FIG. 1 is a block diagram showing the construction of a filter circuit according to an embodiment of the present invention.

FIG. 1 is a block diagram showing the construction of a digital circuit realizing a median filter (hereinbelow simply referred to as a "filter circuit") according to an embodiment of the present invention. Note that the filter circuit has a digital circuit construction capable of clock synchronization. In the present embodiment, filtering processing is performed on all the pixels of original image by sequentially moving a matrix in a horizontal or vertical direction, as in the case of above-described FIG. 2. Since a well-known technique can be applied to the movement of matrix, the movement will not be particularly described in the present embodiment.

Hereinbelow, the respective constituent elements of the filter circuit of the present embodiment will be described with reference to FIG. 1 in an example where M=5 holds as a matrix size and L=8 holds as bit precision of original image data.

In the original image, when a 5×5 matrix is moved by 1 pixel in a horizontal direction, an array of pixels as new matrix elements is inputted into a delay unit 101 and a histogram A update unit 102.

[Delay Unit 101]

Figure 4:
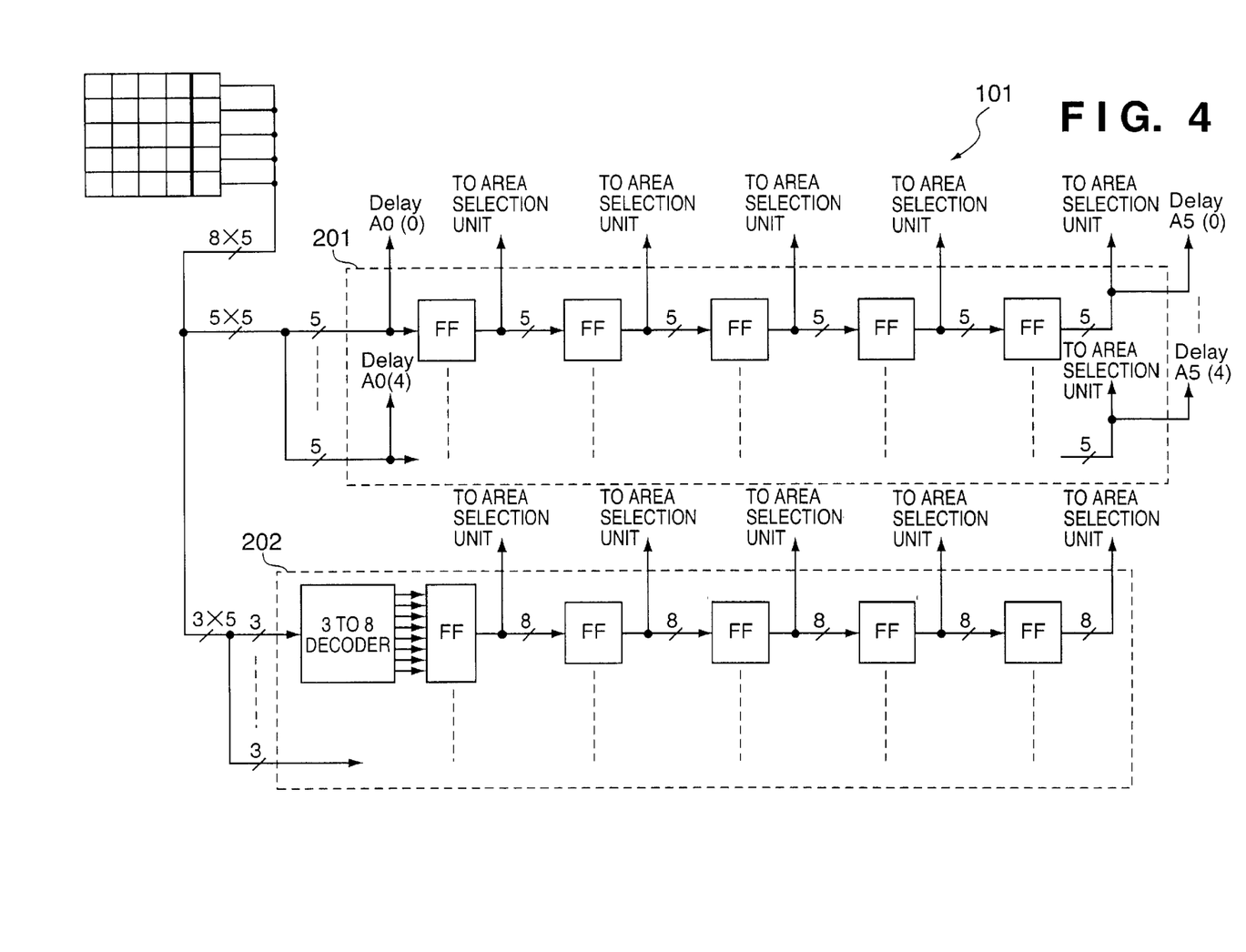
FIG. 4 is a block diagram showing the circuit construction of a delay unit according to the embodiment.

FIG. 4 shows the circuit construction of the delay unit 101.

The delay unit 101 is constructed with 2 data passes (a delay pass A201 and a delay pass B202). The delay pass A201 and the delay pass B202 respectively have parallel 5 arrays of circuits as shown in the figure, for input of array data at the same timing.

The delay pass A201 delays 5 array data Delay A0(0) to Delay A0(4), inputted at each clock for upper 5 bit (P=5) of pixel data, by 5 clocks, i.e., 5 pixels as the matrix row size, by flip-flops (FFs), and finally outputs Delay A5(0) to Delay A5(4). Note that the 1-clock delay outputs from the respective FFs are referred to as Delay A1(0) to Delay A1(4), Delay A2(0) to Delay A2(4), Delay A3(0) to Delay A3(4), and Delay A4(0) to Delay A4(4). The outputs are inputted into an area selection unit 105 to be described later with the outputs Delay A5(0) to Delay A5(4). The delay pass A201 merely delays one row of the matrix.

The delay pass B202 inputs lower 3-bit column data (L−P=3) into 8-bit ($2^{L-P}$=8) FFs via 3 To 8 decoder, and delays the data by 5 clocks as in the case of the delay pass A201. The 1-clock delay outputs from the respective FFs are inputted as Delay A1_Low(0) to Delay A1_Low(4), Delay A2_Low(0) to Delay A2_Low(4), Delay A3_Low(0) to Delay A3_Low(4), Delay A4_Low(0) to Delay A4_Low (4), and Delay A5_Low(0) to Delay A5_Low(4), into the area selection unit 105 to be described later.

As described above, the delay pass A201 and the delay pass B202 respectively have a pipeline FF of serially-connected FFs corresponding to the matrix row size, in correspondence with the number of rows corresponding to the matrix column size. The pipeline FFs are provided in parallel to each other. As described later, histograms of upper 5-bit data and lower 3-bit data of pixels within the matrix are generated with the delayed data from the respective FFs.

[Histogram A Update Unit 102]

Figure 5:
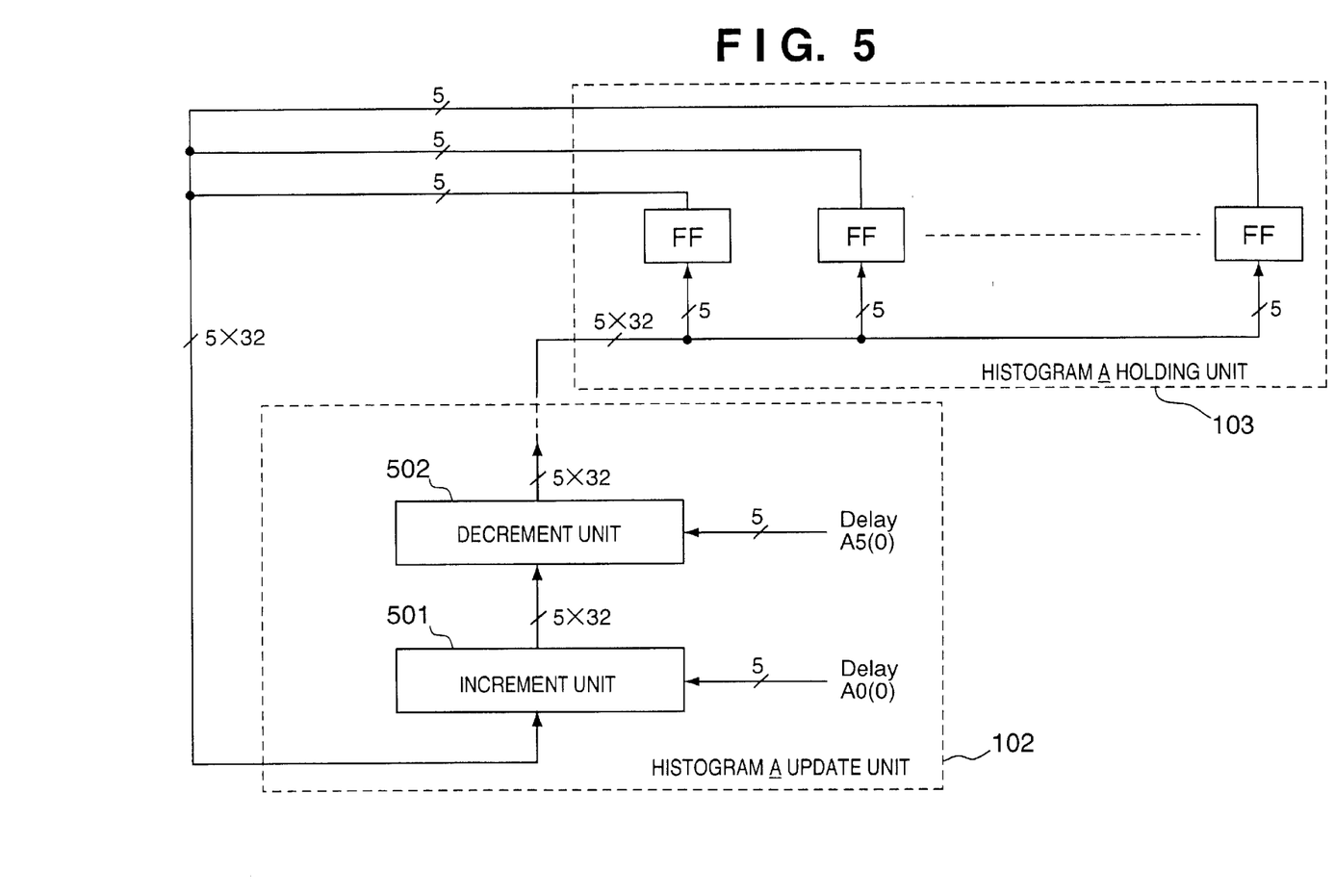
FIG. 5 is a block diagram showing the circuit construction of a histogram A update unit according to the embodiment.

FIG. 5 shows the circuit constructions of the histogram A update unit 102 and a histogram A holding unit 103.

The histogram A update unit 102 inputs column data Delay A0(0) to Delay A0(4) similar to the above-described inputs to the delay pass A201 and the column data Delay A5(0) to Delay A5(4) delayed by the matrix row size by the delay unit 101.

The histogram A holding unit 103 is a register group for holding a histogram A of upper 5-bit data of respective columns of image data, constructed with an array of parallel 32 ($2^P$) 5-bit width FFs capable of representing 25 ($M^2$) pixel elements within the matrix. The 32 FFs correspond to the respective classes of the histogram A. The frequency of each class is the number of pixels.

The outputs from the histogram A holding unit 103 are inputted into the histogram A update unit 102, which updates the histogram A by passing each class data through 5-step (corresponding to the matrix column size M) increment units 501 and 5-step decrement units 502. That is, when the matrix moves, the histogram A is updated based on 5 pixel data (Delay A0(0) to Delay A0(4)) as new matrix elements and 5 pixel data (Delay A5(0) to Delay A5(4)) as previous elements removed from the matrix.

The 5-step increment units 501 input the data Delay A0(0) to Delay A0(4), and the 5-step decrement units 502 input the data Delay A5(0) to Delay A5(4). That is, in the histogram A update unit 102, the combined circuits of the increment units 501 and the decrement units 502 are serially connected in 5 steps, and the final outputs from the 5-step circuits are inputted into the respective FFs of the histogram A holding unit 103.

Figure 6:
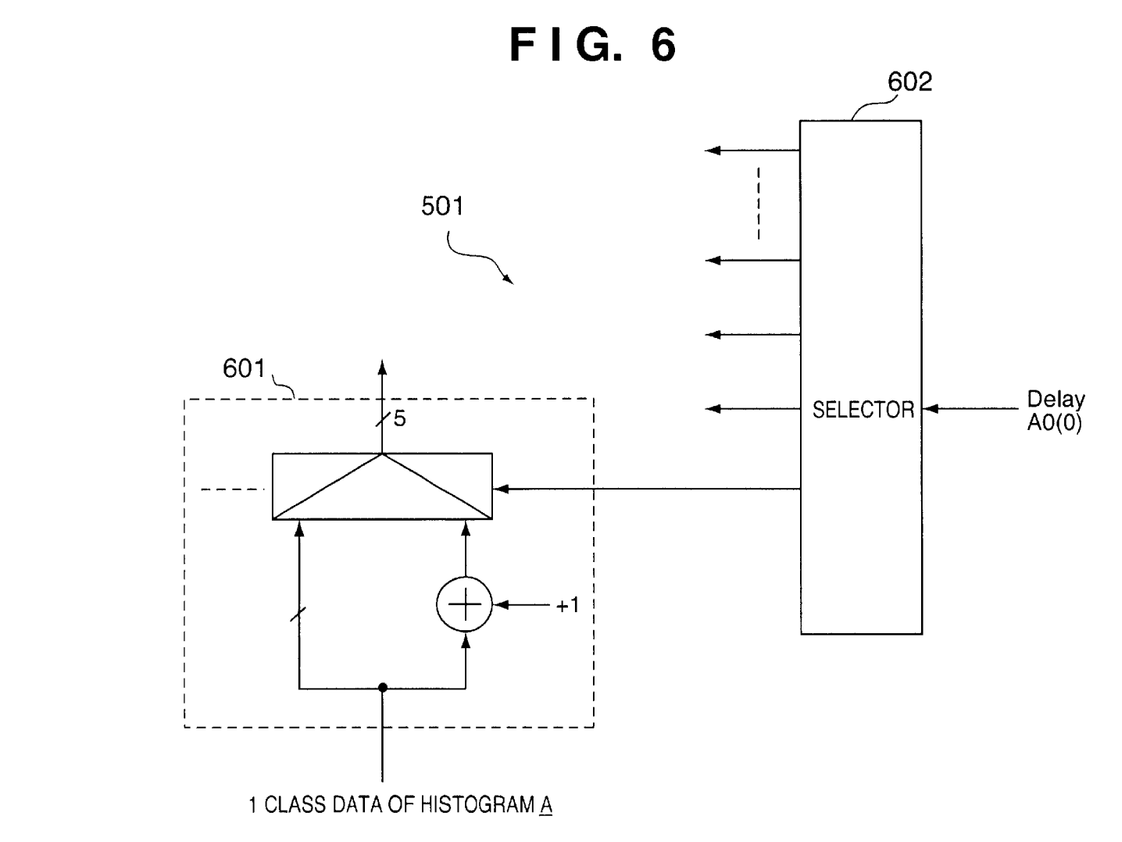
FIG. 6 is a block diagram showing the detailed circuit construction of an increment unit in FIG. 5.

FIG. 6 is a block diagram showing the detailed circuit construction of the increment unit 501. Hereinbelow, the data Delay A0(0) to Delay A0(4) substantially correspond to 5 pixels constructing 1 matrix column, however, description will be made about a case where one of them, Delay A0(0), is inputted into the increment unit 501.

A selector 602 connects the respective 32($2^5$) bit outputs, decoded from the 5-bit data Delay A0(0), i.e., 32 class values of the histogram A, to 32 units in a data update unit 601. The data update unit 601 has 32 units each having a pass for performing increment on input data and a pass for outputting input data value without any processing. In each unit, the incrementer output pass is selected for a class corresponding to the value of the data Delay A0(0), while the other output pass without processing is selected for another class.

Note that the decrement unit 502 has the same construction as that of the increment unit 501 in FIG. 6 except that the incrementer in the data update unit 601 is replaced with a decrementer.

[Cumulative adder A104]

Figure 7:
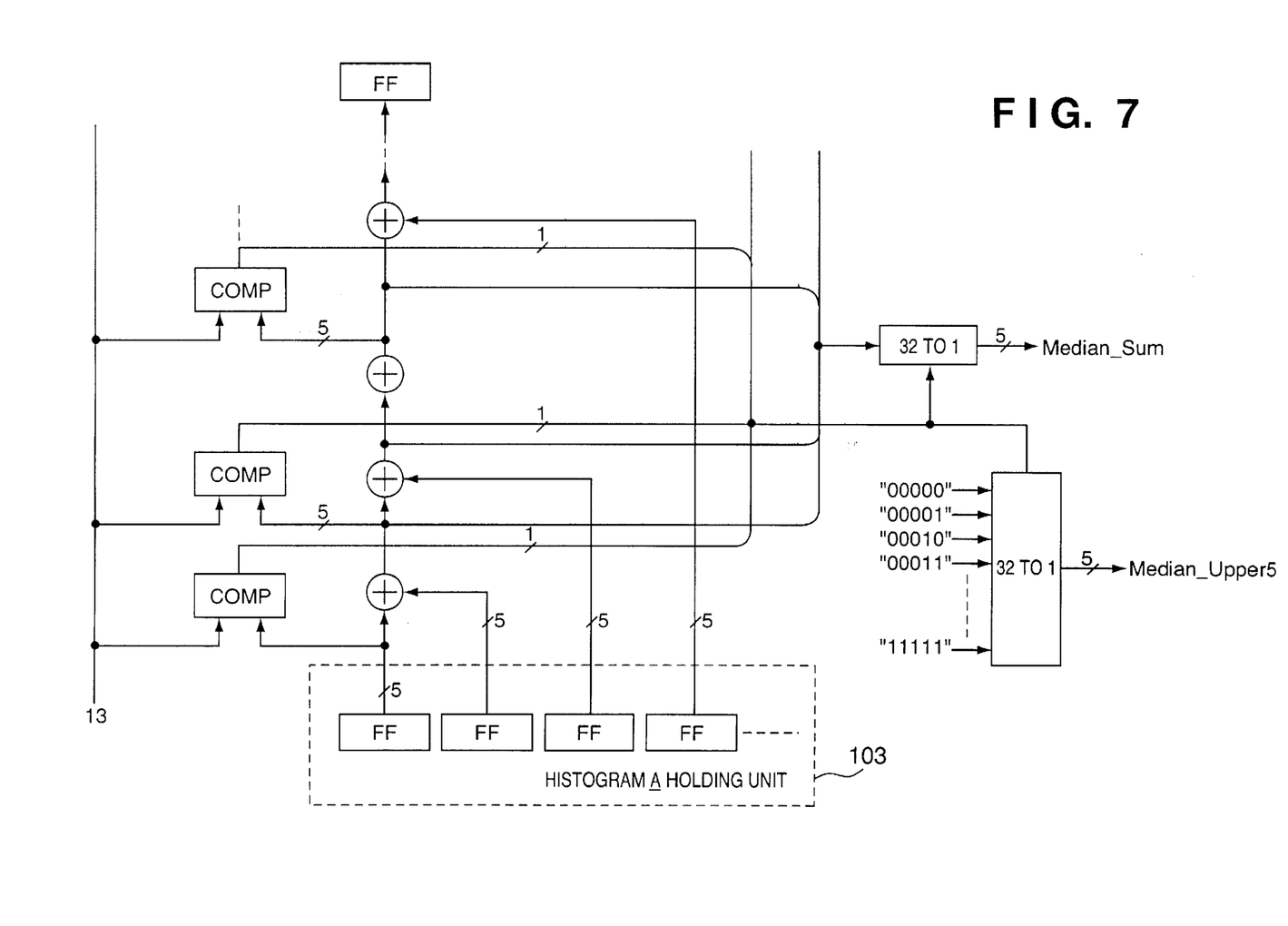
FIG. 7 is a block diagram showing the circuit construction of a cumulative adder A according to the embodiment.

FIG. 7 is a block diagram showing the circuit construction of a cumulative adder 104A.

The cumulative adder 104A obtains the frequency (the number of pixels) of each class by cumulative addition for the purpose of searching a class including a median of the histogram A (hereinbelow referred to as a "target class") held in the histogram holding unit 103.

As the matrix size is 5×5, the median of the histogram A is a 13-th pixel value in ascending order. Accordingly, in the cumulative adder A104, the respective 5-bit FF outputs from the histogram A holding unit 103 are inputted into the adder in the ascending order by class, and the respective outputs are compared with a fixed value "13" by a comparator. A class where the comparator output first exceeds the fixed value "13" can be determined as the target class of the histogram, i.e., a class including the median.

The 32 comparator outputs are used as selection signals for selection between an upper 5-bit (P=5) output (Median_Upper5 in FIG. 7) and the total number of pixels up to the class including the median in the histogram (Median_Sum in FIG. 7). That is, the output Median_Upper5 outputted from the cumulative adder A104 indicates a target class, and the output Median-Sum, the total number of pixels up to the target class.

[Area Selection Unit 105]

Figure 8:
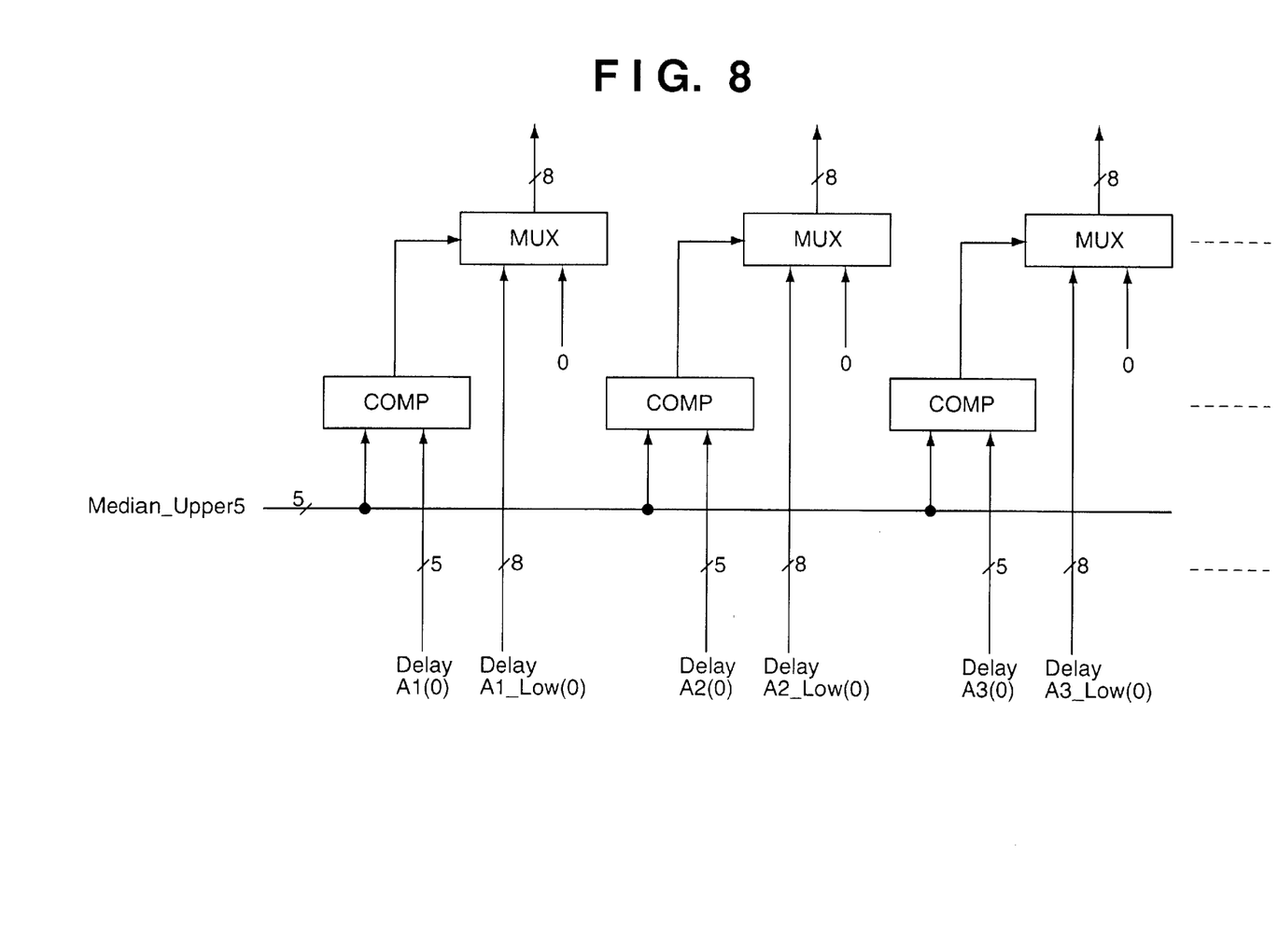
FIG. 8 is a block diagram showing the circuit construction of an area selection unit A according to the embodiment.

FIG. 8 is a block diagram showing the circuit construction of the area selection unit 105.

The area selection unit 105 selects only pixel data constructing the target class of the histogram A.

The area selection unit 105 selects pixels having the same value as that of the Median_Upper5 signal, i.e., pixels within the target class, from 25 matrix pixels, by comparing the Median_Upper5 signal inputted from the cumulative adder A104 with 25 upper 5-bit delay data (Delay A1(0-5) to Delay A5(0-5)) inputted from the delay pass A201 of the delay unit 101.

Further, the area selection unit 105 inputs 8-bit signals (Delay A1_Low(0-5) to Delay A5_Low(0-5)) decoded from lower 3 bits outputted from the delay pass B202, in correspondence with all the pixels of the matrix.

Then, regarding a pixel having the same upper 5-bit value as the Median_Upper5 signal, the area selection unit 105 outputs an 8-bit signal decoded from the lower 3 bits, on the other hand, regarding the other pixels, outputs an 8-bit signal having all-0 values, for all the 25 pixels constructing the matrix. That is, the area selection unit 105 outputs the result of lower 3-bit decoding only regarding pixels within the target class.

In this manner, in the present embodiment, first, a histogram A is generated, then a class of the histogram A including a median is narrowed down as a target class. Next, a histogram B is generated only with pixels included in the target class, and further, its median is narrowed down. That is, the median of the matrix is searched by two-stage search based on two histograms.

[Histogram B Update Unit 106]

Figure 9:
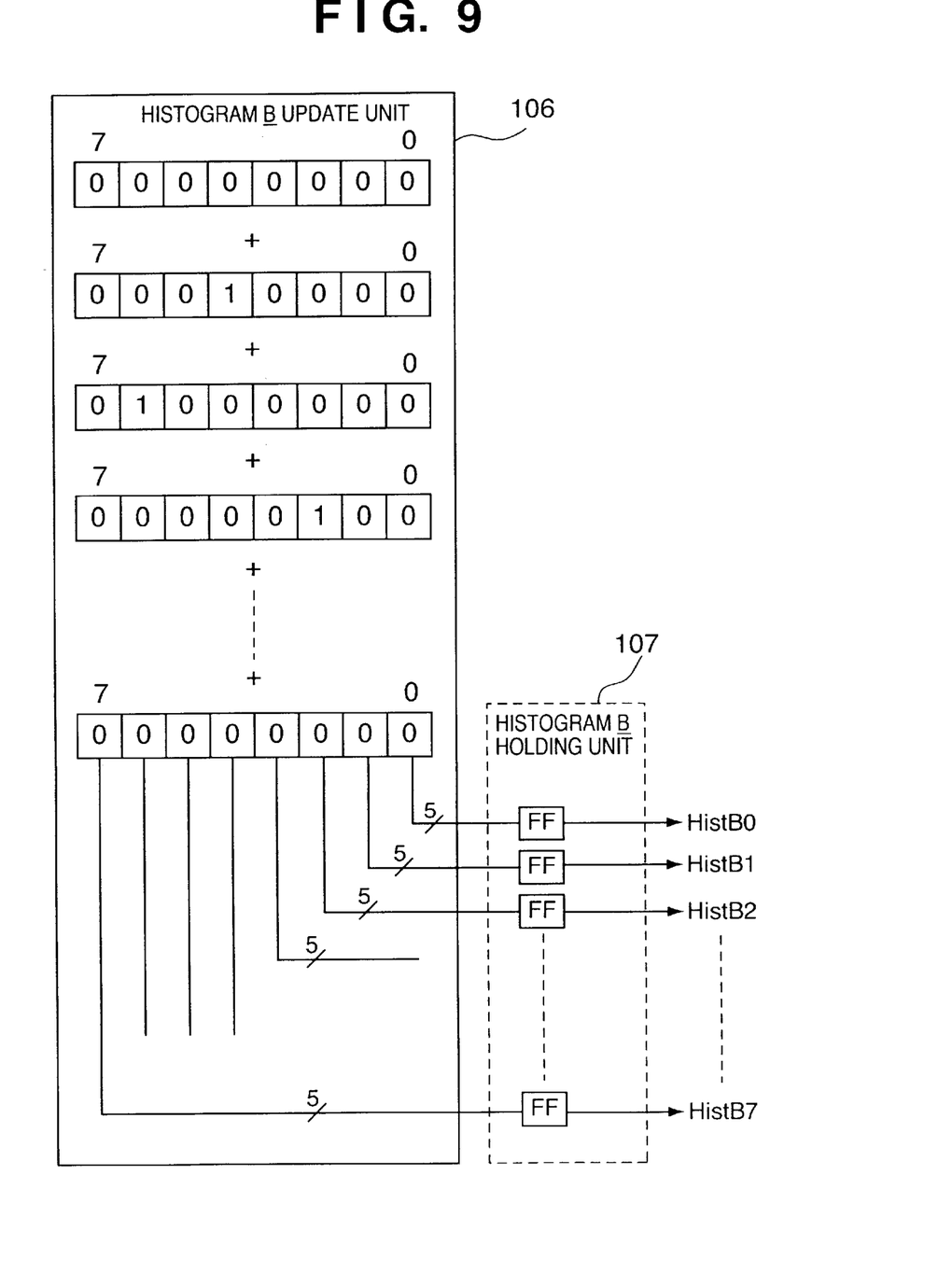
FIG. 9 is a block diagram showing the circuit construction of a histogram B update unit according to the embodiment.

FIG. 9 shows a circuit construction of the histogram B update unit 106 and the histogram B holding unit 107.

The histogram B holding unit 107 is a register group for holding the histogram B resulted from decoding of the lower 3-bit data of pixels within the target class, constructed with parallel 8 5-bit width FFs. The respective FFs correspond to respective classes of the histogram B. That is, the histogram B has 8 classes, and the frequency of each class (the number of pixels) is updated by each clock.

The histogram B update unit 106 inputs total 25 signals, i.e., 8-bit signals for 25 pixels within the matrix, including 8-bit results of lower 3-bit decoding of pixels selected by the area selection unit 105 as pixels within the target class, and 8-bit signals having all-0 values corresponding to the other pixels.

Among the input 8-bit signals for the 25 pixels, regarding a pixel within the target class, as the signal is 8-bit result of lower 3-bit decoding, one of the 8 bits has a value "1", and regarding the other pixels, all the 8 bits have a value "0". Accordingly, the histogram B update unit 106 generates the histogram B based on the bit position of the value "1". That is, the 8 classes of the histogram B indicate the respective bit positions, and in other words, each 8-bit value representable by lower 3 bits of pixel value indicates the number of pixels of the class.

Accordingly, as shown in FIG. 9, the histogram B update unit 106 constructs the histogram B by performing cumulative addition for 25 pixels with respect to the bit position of each 8-bit signal, and stores the histogram into the histogram B holding unit 107.

[Cumulative Adder B108]

Figure 10:
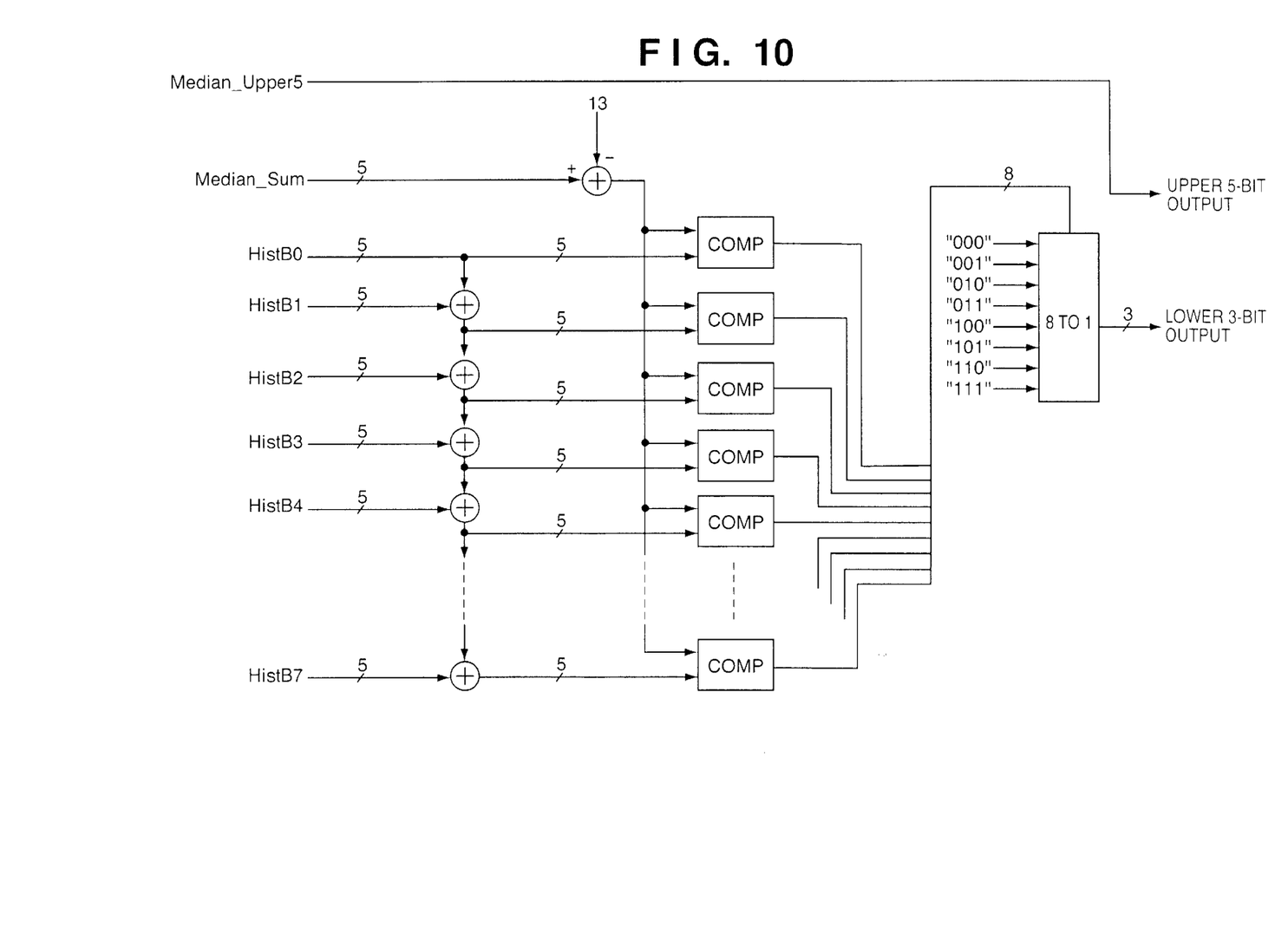
FIG. 10 is a block diagram showing the circuit construction of a cumulative adder B according to the embodiment.

FIG. 10 is a block diagram showing the circuit construction of the cumulative adder B 108.

The cumulative adder B108 searches for the median of the matrix based on the histogram B.

The cumulative adder B108 inputs outputs from the respective FFs (Hist B0 to Hist B7) from the histogram B holding unit 107, i.e., the frequencies (the numbers of pixels) of the respective classes of the histogram B, and cumulatively adds the outputs in ascending order.

Further, the fixed value "13" indicative of the middle rank is subtracted from the Median_Sum signal indicative of the total number of pixels up to the target class of the histogram A, inputted from the cumulative adder A104. The result of subtraction represents the rank in ascending order of the median of pixel values within the target class narrowed down in the histogram A. Accordingly, the cumulative adder B107 cumulatively adds the number of pixels for each class in the histogram B in ascending order, and sequentially compares the result of addition with the result of subtraction, thereby determines lower 3 bits of the median of the matrix. Then the cumulative adder B107 decodes the obtained comparator output and obtains the lower 3-bit output.

Then, the cumulative adder B107 combines the obtained lower 3-bit output with the Median_Upper5 signal indicative of the upper 5-bit output of the median, and finally outputs an 8-bit signal indicative of the median of the matrix as an output value of the filter circuit according to the present embodiment.

[Processing Flowchart]

Figure 11:
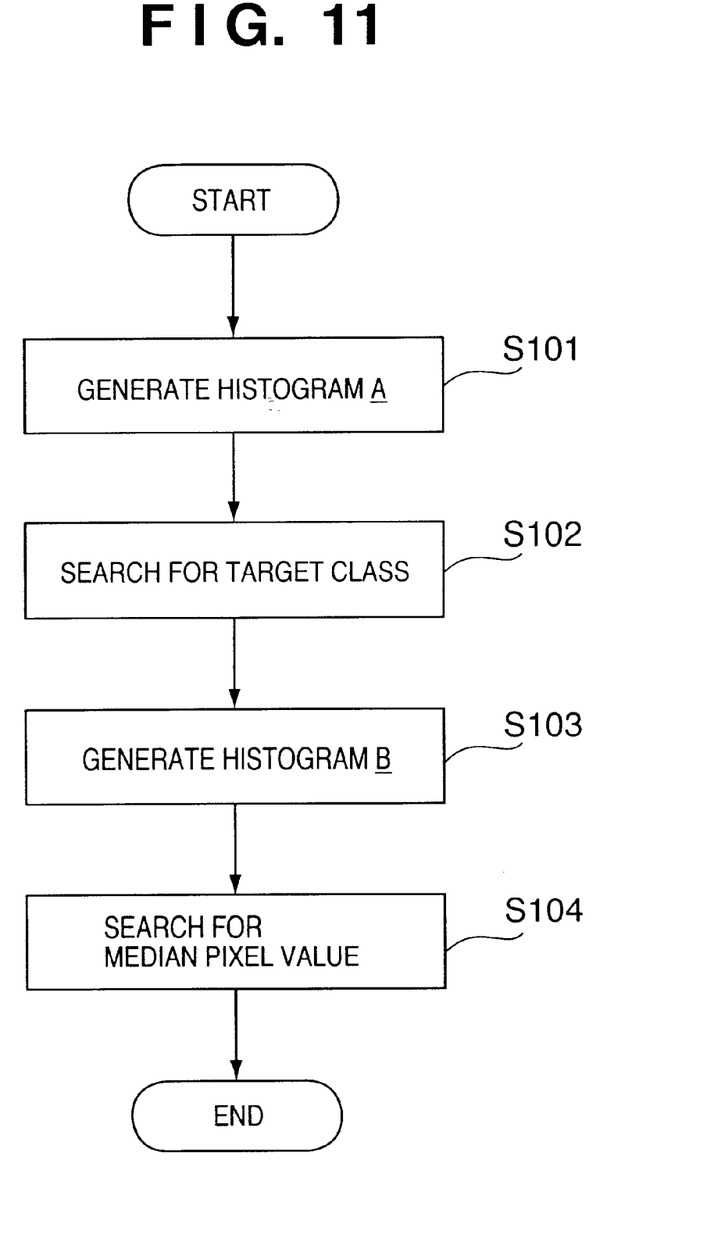
FIG. 11 is a flowchart showing processing in the filter circuit according to the embodiment.

Next, filtering processing in the filter circuit of the present embodiment will be described with the flowchart of FIG. 11.

At step S101, the histogram A is generated with upper bit data of pixels within the matrix. This processing is mainly realized by the histogram A update unit 102.

Next, at step S102, a class including a pixel value corresponding to a middle rank is searched as a target class based on the histogram A. This processing is mainly realized by the cumulative adder A104.

Next, at step S103, the histogram B is generated with lower bit data of pixels included in the target class of the histogram A. This processing is mainly realized by the area selection unit 105 and the histogram B update unit 106.

Then finally at step S104, a middle-ranked pixel value within the matrix is searched based on the histogram B. This processing is mainly realized by the cumulative adder B108.

In this manner, the median within the matrix can be detected by generating a histogram of upper bits of pixels within the matrix and a histogram of lower bits of pixels and performing two-step searching.

As described above, according to the filter circuit of the present embodiment, even if the matrix size M increases, for example, the increase in circuit scale is suppressed to increase approximately proportional to the increase in the matrix size M without drastically increase by, e.g., insertion of pipeline FFs into the delay passes A201 and B202 in the delay unit 101. Accordingly, a large-scale median filter can be realized as a digital circuit.

Further, as the insertion of pipeline FFs can be easily made, in clock synchronous designing, it is unnecessary to serially connect multi-step comparators and selectors for processing within 1 clock as in the case of the conventional art shown in FIG. 3. Accordingly, when the circuit scale increases, the circuit scale is consistent with the data sequence, and a high-speed operation of the circuit can be expected.

<Modification>

Note that the present embodiment has been described as an example where the output from the filter circuit is the median of the matrix, however, the present invention is not limited to this example. For example, in case of outputting a K-th pixel value in ascending order among pixel values within the matrix, the fixed value "13" as the object of comparison with the value resulted from the cumulative addition by the cumulative adder A in FIG. 7 and the fixed value "13" as the amount of subtraction from the Median_Sum by the cumulative adder B108 in FIG. 10 are respectively set to "K". Accordingly, by setting the parameter K indicative of the output rank in ascending order in place of the fixed value, a filter which outputs a pixel value of arbitrary rank (K-th) in ascending order can be easily constructed.

Further, the matrix that moves on the original image in the filter circuit of the present invention is not limited to the M×M square matrix but may be realized as an M×N sized matrix.

The present invention can be applied to a system constituted by a plurality of devices (e.g., a host computer, an interface, a reader and a printer) or to an apparatus comprising a single device (e.g., a copy machine or a facsimile apparatus).

As many apparently widely different embodiments of the present invention can be made without departing from the spirit and scope thereof, it is to be understood that the invention is not limited to the specific embodiments thereof except as defined in the appended claims.

What is claimed is:

1. An image filter circuit which moves a pixel matrix on an original image, replaces a value of pixel of interest in said pixel matrix with a pixel value of predetermined rank in ascending order within said matrix, and outputs the pixel value of the predetermined rank, comprising:

first histogram generation means for generating a first histogram with upper bit data of pixels constructing said pixel matrix;

first search means for searching for a class including a pixel value corresponding to said predetermined rank in ascending order, as a target class, based on said first histogram;

second histogram generation means for generating a second histogram with lower bit data of pixels included in said target class; and second search means for searching for said pixel value of said predetermined rank in ascending order based on said second histogram.

2. The image filter circuit according to claim 1, further comprising delay means for dividing respective pixels constructing said pixel matrix into upper bit data and lower bit data and delaying the respective data, wherein said first and second histogram generation means generate said first and second histograms based on said upper bit data and said lower bit data delayed by said delay means.

3. The image filter circuit according to claim 2, wherein said first search means detects a class including a pixel value corresponding to said predetermined rank in ascending order as the target class, by cumulatively adding the number of pixels by class in said first histogram, and outputs a value of said target class and the number of pixels resulted from cumulative addition up to said target class.

4. The image filter circuit according to claim 3, wherein said second histogram generation means includes:

candidate pixel selection means for selecting pixels included in said target class as candidate pixels by comparing said upper bit data outputted from said delay means with the value of said target class, and outputting said lower bit data corresponding to said candidate pixels; and generation means for generating said second histogram with said lower bit data corresponding to said candidate pixels.

5. The image filter circuit according to claim 4, wherein said second search means searches for the pixel value of said predetermined rank in ascending order within said pixel matrix by cumulatively adding the number of pixels by class in said second histogram and comparing the number of pixels resulted from cumulative addition with the number of pixels resulted from cumulative addition outputted from said first search means.

6. The image filter circuit according to claim 5, wherein said delay means inputs values of new pixels of said pixel matrix, resulted by moving of said pixel matrix on the original image, by L-bit precision (L is a natural number), and said delay means includes:

a first delay pass that delays upper P-bit data (P is a natural number) of the value of said new pixels; and a second delay pass that decodes lower L-P bit data of the value of said new pixels to $2^{L-P}$ bit data and delays the data.

7. The image filter circuit according to claim 6, wherein said first and second delay passes respectively output delay data corresponding to all the pixels constructing said pixel matrix upon each input of new pixels corresponding to one column of said pixel matrix.

8. The image filter circuit according to claim 7, wherein said first and second delay passes respectively have a flip-flop array corresponding to the number of said new pixels.

9. The image filter circuit according to claim 6, wherein said first histogram generation means generates said first histogram having $2^P$ classes based on the upper P-bit data of said new pixels and the upper P-bit delay data outputted from said first delay pass.

10. The image filter circuit according to claim 9, wherein said first histogram generation means includes:

addition means for adding the upper P-bit data of said new pixels to said first histogram; and subtraction means for subtracting the upper P-bit delay data, outputted from said first delay pass, from said first histogram.

11. The image filter circuit according to claim 6, wherein said candidate pixel selection means selects said candidate pixels by comparing said upper P-bit delay data outputted from said first delay pass with the value of said target class, and outputs said lower L-P bit delay data, outputted from said second delay pass corresponding to said candidate pixels.

12. The image filter circuit according to claim 6, wherein said second histogram generation means generates said second histogram having $2^{L-P}$ classes based on said lower L-P bit delay data of said candidate pixels.

13. The image filter circuit according to claim 1, wherein said predetermined rank in ascending order is a middle rank within said pixel matrix.

14. The image filter circuit according to claim 1, wherein said pixel of interest is positioned in the center of said pixel matrix.

15. An image filtering method for moving a pixel matrix on an original image, replacing a value of pixel of interest in said pixel matrix with a pixel value of predetermined rank in ascending order within said matrix, and outputting the pixel value of the predetermined rank, comprising:

- a first histogram generation step of generating a first histogram with upper bit data of pixels constructing said pixel matrix;
- a first search step of searching for a class including a pixel value corresponding to said predetermined rank in ascending order, as a target class, based on said first histogram;
- a second histogram generation step of generating a second histogram with lower bit data of pixels included in said target class; and
- a second search step of searching for said pixel value of said predetermined rank in ascending order based on said second histogram.

16. An image processing apparatus which eliminates isolated dot noise from an original image by using an image filter circuit that moves a pixel matrix on an original image, replaces a value of pixel of interest in said pixel matrix with a pixel value of predetermined rank in ascending-order within said matrix, and outputs the pixel value of the predetermined rank, said image filter circuit comprising:

- first histogram generation means for generating a first histogram with upper bit data of pixels constructing said pixel matrix;
- first search means for searching for a class including a pixel value corresponding to said predetermined rank in ascending order, as a target class, based on said first histogram;
- second histogram generation means for generating a second histogram with lower bit data of pixels included in said target class; and
- second search means for searching for said pixel value of said predetermined rank in ascending order based on said second histogram.

* * * * *